United States Patent
Bevilaqua et al.

(10) Patent No.: US 12,381,439 B2
(45) Date of Patent: Aug. 5, 2025

(54) DIRECT-DRIVE, AXIALLY FLUX ORIENTED, ELECTRIC MOTOR ASSEMBLY HAVING PRIMARY HEAT CONDUCTION PATHWAY FROM STATOR TO BEARING HOUSING

(71) Applicant: Fisher & Paykel Appliances Limited, Auckland (NZ)

(72) Inventors: Matheus Alexandre Bevilaqua, Auckland (NZ); Russell Joseph Jackson, Auckland (NZ)

(73) Assignee: Fisher & Paykel Appliances Limited (NZ)

( * ) Notice: Subject to any disclaimer, the term of this patent is extended or adjusted under 35 U.S.C. 154(b) by 0 days.

(21) Appl. No.: 17/619,720

(22) PCT Filed: Jun. 17, 2020

(86) PCT No.: PCT/IB2020/055627
§ 371 (c)(1),
(2) Date: Dec. 16, 2021

(87) PCT Pub. No.: WO2020/254969
PCT Pub. Date: Dec. 24, 2020

(65) Prior Publication Data
US 2022/0311303 A1    Sep. 29, 2022

(30) Foreign Application Priority Data
Jun. 17, 2019  (NZ) ........................................ 754649

(51) Int. Cl.
*H02K 9/22*   (2006.01)
*D06F 37/20*  (2006.01)
(Continued)

(52) U.S. Cl.
CPC ......... *H02K 5/1737* (2013.01); *D06F 37/206* (2013.01); *D06F 37/304* (2013.01);
(Continued)

(58) Field of Classification Search
CPC .......... H02K 21/00; H02K 21/24; H02K 5/00; H02K 5/04; H02K 5/17; H02K 5/173;
(Continued)

(56) References Cited

U.S. PATENT DOCUMENTS 5,809,809 A     9/1998   Neumann et al.
6,005,312 A  *  12/1999  Yamane ............... H02K 5/1675
                                                      310/90
(Continued)

FOREIGN PATENT DOCUMENTS

CN       1293276 A     5/2001
CN       1419004 A     5/2003
(Continued)

*Primary Examiner* — Tran N Nguyen
(74) *Attorney, Agent, or Firm* — Clark Hill PLC; James R. Foley

(57) ABSTRACT

An electric motor assembly suitable for use in a laundry washing machine or dryer or washer-dryer, is of the axial flux permanent magnet synchronous motor direct-drive type, with the stator coils carried by a rotor bearing housing component to provide a primary heat conduction pathway from the stator coils to the bearing housing component, and to a drum of the machine. The motor may be positioned between axially spaced bearings mounting the rotor.

15 Claims, 4 Drawing Sheets

(51) Int. Cl.
*D06F 37/30* (2020.01)
*F16C 19/52* (2006.01)
*F16C 19/56* (2006.01)
*F16C 35/067* (2006.01)
*H02K 5/16* (2006.01)
*H02K 5/173* (2006.01)
*H02K 7/08* (2006.01)
*H02K 21/24* (2006.01)

(52) U.S. Cl.
CPC ............ *F16C 19/525* (2013.01); *F16C 19/56* (2013.01); *F16C 35/067* (2013.01); *H02K 7/088* (2013.01); *H02K 9/223* (2021.01); *H02K 21/24* (2013.01); *F16C 2380/26* (2013.01)

(58) Field of Classification Search
CPC .. H02K 5/1732; H02K 5/1735; H02K 5/1737; H02K 5/207; H02K 7/00; H02K 7/08; H02K 7/088; H02K 7/10; H02K 7/14; H02K 9/00; H02K 9/06; H02K 9/22; H02K 9/223; H02K 41/00; H02K 41/03; H02K 41/031; F16C 19/00; F16C 19/52; F16C 19/525; F16C 19/56; F16C 35/00; F16C 35/06; F16C 35/067; D06F 37/00; D06F 37/26; D06F 37/262; D06F 37/264; D06F 37/30; D06F 37/304
See application file for complete search history.

(56) References Cited

U.S. PATENT DOCUMENTS

| | | | |
|---|---|---|---|
| 6,006,553 A | 12/1999 | Lee et al. | |
| 6,681,602 B2 | 1/2004 | Heyder et al. | |
| 6,762,527 B1 * | 7/2004 | Horng | H02K 21/24 310/90 |
| 7,541,702 B2 * | 6/2009 | Murakami | H02K 9/06 310/67 R |
| 7,626,295 B2 * | 12/2009 | Yamaguchi | F04D 25/0653 310/156.32 |
| 7,663,287 B2 * | 2/2010 | Haga | H02K 3/522 310/260 |
| 7,750,515 B1 * | 7/2010 | Gabrys | H02K 9/08 310/268 |
| 8,616,029 B2 | 12/2013 | Maentele et al. | |
| 9,850,614 B2 | 12/2017 | Chiriatti | |
| 2002/0194884 A1 * | 12/2002 | Heyder | D06F 37/304 68/140 |
| 2005/0200225 A1 | 9/2005 | Kim et al. | |
| 2008/0292479 A1 * | 11/2008 | Lin | F04D 29/056 417/423.7 |
| 2009/0064727 A1 | 3/2009 | Choi et al. | |
| 2010/0275660 A1 * | 11/2010 | Yoon | H02K 21/24 310/215 |
| 2010/0319896 A1 | 12/2010 | Rajaraman | |
| 2018/0127909 A1 | 5/2018 | Cho et al. | |
| 2018/0159394 A1 | 6/2018 | Duncan et al. | |

FOREIGN PATENT DOCUMENTS

| | | | |
|---|---|---|---|
| CN | 104040850 A | 9/2014 | |
| CN | 102939415 | 12/2015 | |
| CN | 108023453 A | 5/2018 | |
| DE | 19520330 A1 | 12/1996 | |
| DE | 69306204 | 1/1997 | |
| DE | 19961780 A1 * | 7/2001 | ............... H02K 7/14 |
| EP | 1796249 A2 | 6/2007 | |
| FR | 1354594 A | 3/1964 | |
| KR | 20090097523 A | 9/2009 | |
| KR | 20100089162 A | 8/2010 | |
| WO | 2011/157589 A1 | 12/2011 | |
| WO | 2018/155843 A1 | 8/2018 | |

* cited by examiner

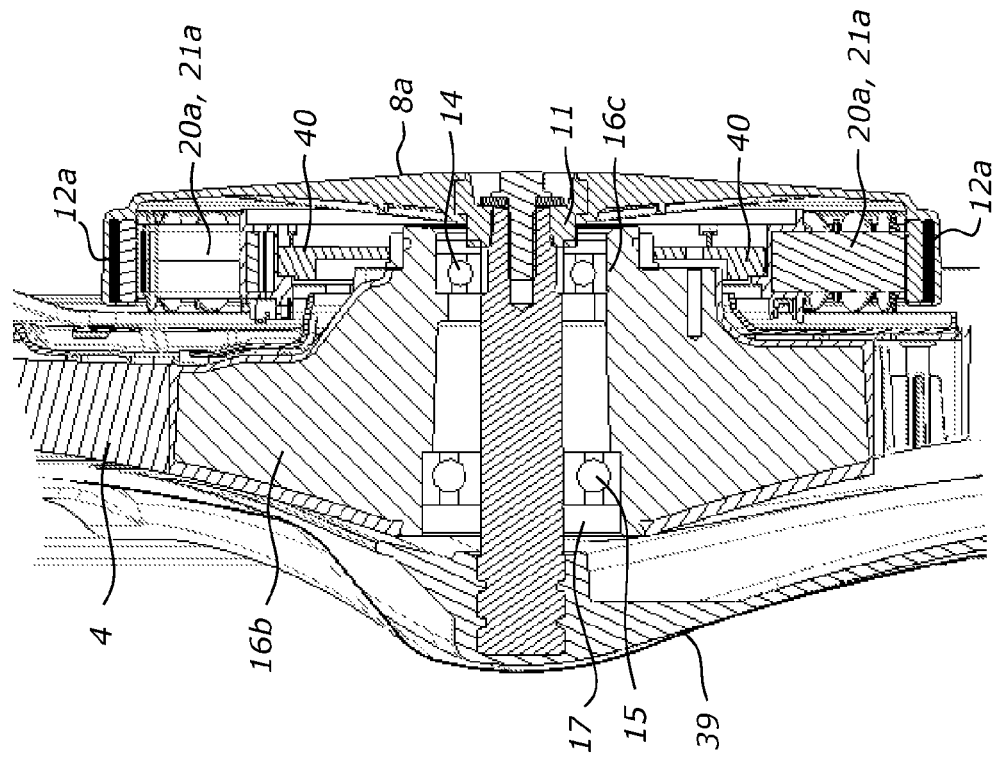
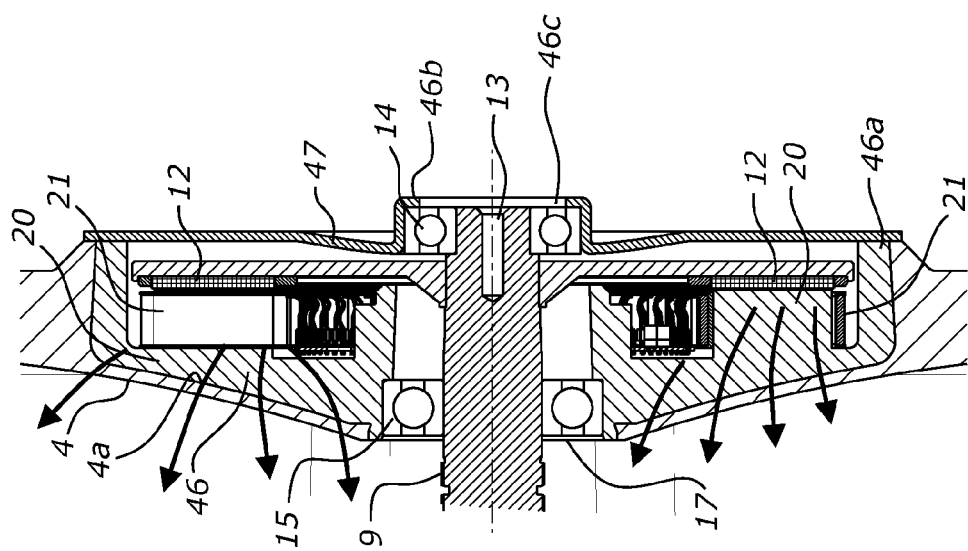
*FIGURE 5*
*FIGURE 6* Prior Art

DIRECT-DRIVE, AXIALLY FLUX ORIENTED, ELECTRIC MOTOR ASSEMBLY HAVING PRIMARY HEAT CONDUCTION PATHWAY FROM STATOR TO BEARING HOUSING

TECHNICAL FIELD

The invention relates to an axial flux permanent magnet synchronous motor direct-drive electric motor assembly suitable for use in for example a laundry washing machine.

BACKGROUND

Direct-drive electric motors are commonly used in laundry washing machines. The motor directly drives a shaft without a belt or other form of motion transmission device between the rotor and shaft. Requirements for a direct drive electric motor in a washing machine include that the motor produce enough torque for reliable starting, minimise motor temperature rise, and be of a minimum thickness so the motor does not take space from the washing machine tub (therefore the washing machine can accommodate a larger amount of clothes for a given footprint—washer capacity).

Electric motors used in direct-drive washing machines are commonly of the radial flux—permanent magnet synchronous motor type (RF-PMSM), with an external rotor. The magnetic flux path is oriented radially. In an RF-PMSM motor of a given diameter, torque output is proportional to the thickness of the motor in the axial direction, and the efficiency of the motor is proportional to the length of the stator poles i.e. motor diameter.

An axial flux permanent magnet synchronous motor (AF-PMSM) is one in which the magnetic flux is oriented axially. In an AF-PMSM motor, torque output scales with motor diameter in the radial direction, and efficiency scales with the motor thickness in the axial direction. AF-PMSM motors have previously been proposed for use in laundry washing machines—see US patent specification 20100275660 and PCT international patent specification WO2018155843.

It is an object of the invention to provide an improved or at least alternative form of direct-drive AF-PMSM electric motor assembly suitable for use in a laundry washing machine or dryer, or washer-dryer combination laundry machine.

SUMMARY OF INVENTION

In broad terms the invention comprises an electric motor assembly suitable for use in a laundry washing machine or dryer or washer-dryer, the motor assembly comprising:
an electric motor comprising a stator comprising stator coils and a rotor comprising permanent magnets and directly-driving an output drive shaft from the motor, wherein the rotor magnets and stator coils are spaced axially so that the magnetic flux path between the rotor magnets and stator coils is oriented axially,
a rotor bearing housing component adapted to be associated with the base of the outer drum or tub of the machine, with the stator associated with the bearing housing component, with a heat conduction pathway from the stator coils to the bearing housing component.

In one embodiment the stator coils are wound on stator cores carried by a stator frame attached to the bearing housing component.

In another embodiment the stator coils are wound on stator cores carried directly by/integrated with the bearing housing component.

Optionally the motor may be positioned between axially spaced bearings mounting the rotor.

In another aspect in broad terms the invention comprises an electric motor assembly suitable for use in a laundry washing machine or dryer or washer-dryer, the motor assembly comprising:
an electric motor comprising a stator comprising stator coils and a rotor comprising permanent magnets and directly-driving an output drive shaft from the motor,
a rotor bearing housing component adapted to be associated with the base of the tub of the machine, with the stator associated with the bearing housing component, with a heat conduction pathway from the stator coils to the bearing housing component, and
wherein the motor is positioned between axially spaced bearings mounting the rotor.

The invention also includes a laundry machine or dryer or washer-dryer including the electric motor assembly.

In this specification the term "comprising" means "consisting at least in part of". When interpreting a statement in this specification and claims that includes "comprising", features other than that or those prefaced by the term may also be present. Related terms such as "comprise" and "comprises" are to be interpreted similarly.

BRIEF DESCRIPTION OF DRAWINGS

Preferred forms of the invention will now be described with reference to the accompanying drawings, in which:

FIG. 5 is a cross-sectional view through a direct-drive electric motor assembly mounted to the closed end of a washing machine drum of a horizontal axis machine, according to a third embodiment of the invention, and FIG. 6 is a cross-sectional view similar to FIGS. 3 to 5 but through a prior art direct-drive electric motor assembly, mounted to the closed end of a washing machine drum of a horizontal axis machine.

DESCRIPTION OF EMBODIMENTS

Figure 1:
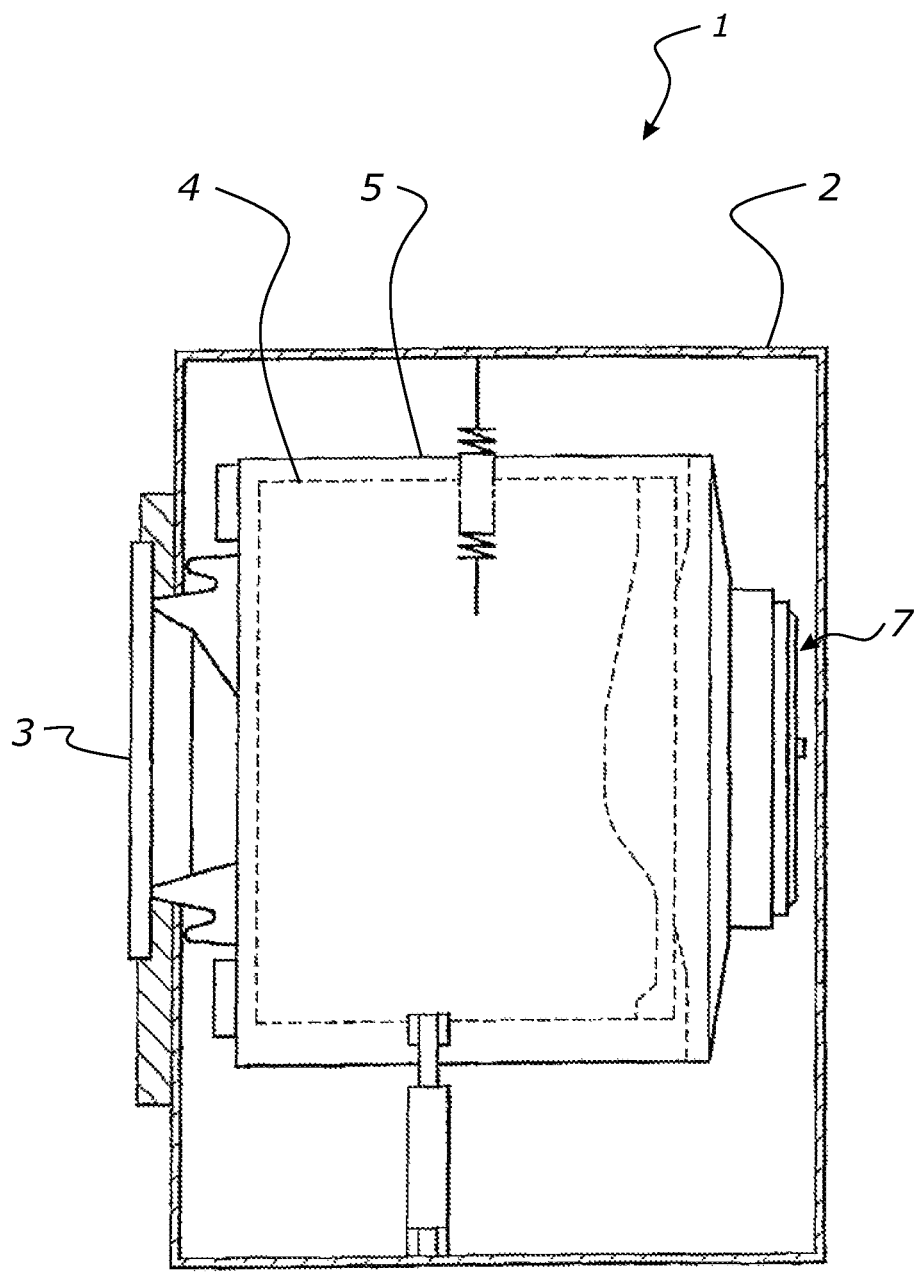
FIG. 1 is a partly vertical cross-sectioned view of a front-loading, horizontal axis laundry washing machine incorporating an electric motor according to any of the preferred embodiments.
Figure 2:
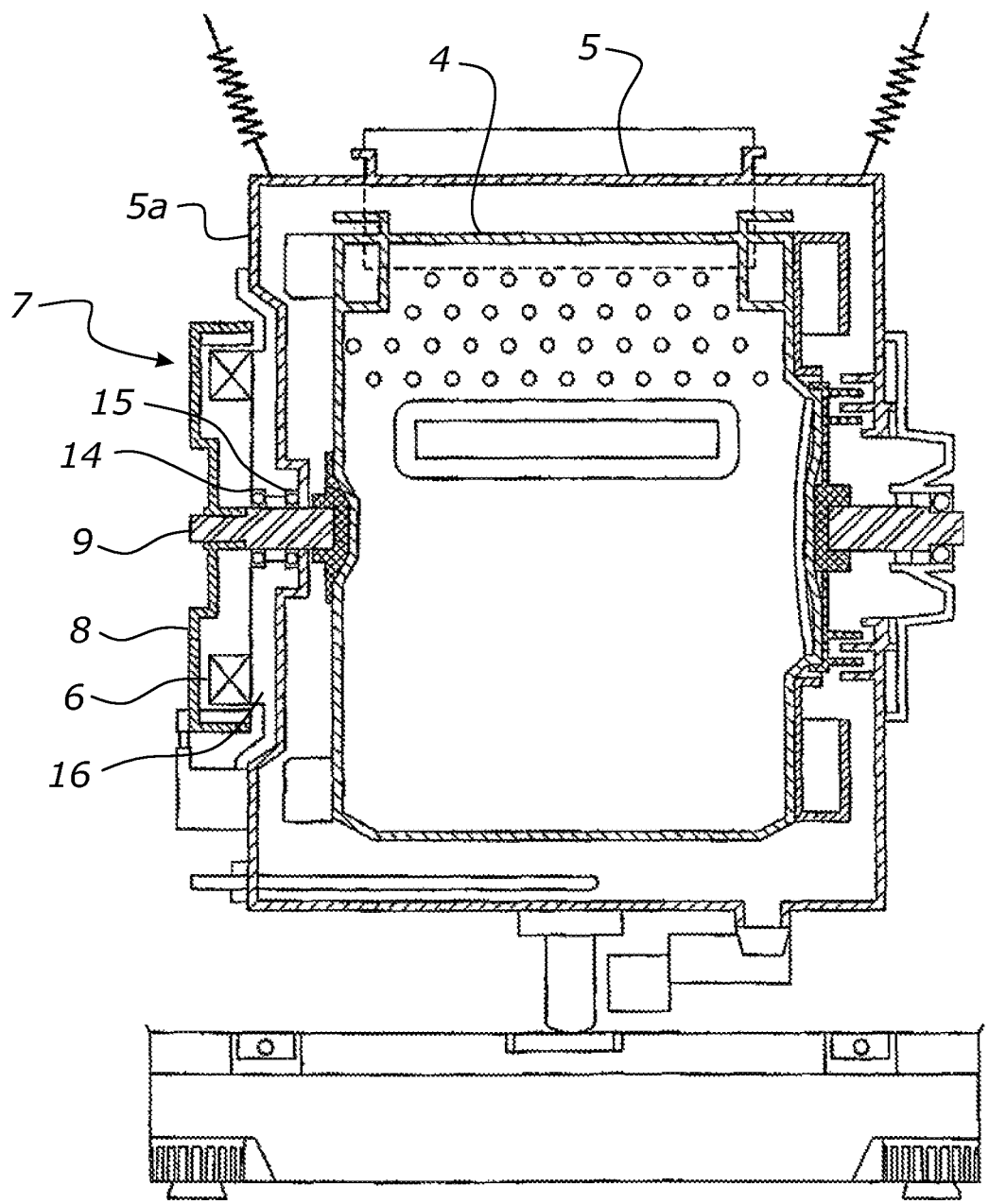
FIG. 2 is a fully vertical cross-sectioned view of a top or tilt-access, horizontal axis laundry washing machine incorporating an electric motor according to any of the preferred embodiments.

Referring to FIG. 1 a laundry washing machine 1 of the front-loading or horizontal-axis variety is shown. The front-loading washing machine includes an outer cabinet 2 with a front door 3 allowing access to a perforated rotatable inner drum 4 for holding a load of laundry such as clothing for washing, and mounted within the outer cabinet to rotate about a horizontal axis. A generally cylindrical, fixed (non-rotating) outer drum 5 for containing washing liquid is mounted (suspended) within the cabinet 2 around the rotating inner drum 4. FIG. 2 shows the inner and outer drums 4 and 5 and motor 7 of another horizontal-axis machine laundry washing machine which in this case is a top-loading or tilt access not front-loading machine. In FIG. 2 the machine is shown fully cross-sectioned FIG. 2 does not also show the external cabinet.

In both cases the stator 6 of a Brushless DC (BLDC) or Permanent Magnet (PM) electric motor 7 is fixedly attached to the end 5a (see FIG. 2) of the (non-rotating) outer drum 5. Rotor 8 external to the outer drum 5 is rotationally fixed to the outer end of a rotor shaft 9 which extends through a passage in the end of the outer drum 5 and carries the rotating inner drum 4 at its other end. The rotor shaft 9 is mounted via at least one or more bearings 14, such as roller bearings, carried by a bearing housing component 16 fixed to the end of the outer drum 5. In the top or tilt access machine of FIG. 2 the rotating inner drum 5 is supported by bearings at both horizontal ends. A machine controller and/or motor controller (not shown) provide appropriate commutation signals to stator windings provided around the stator poles so that the rotor's rotational speed and direction may be dictated during the various cycles of a user-set wash programme of the machine.

Figure 3:
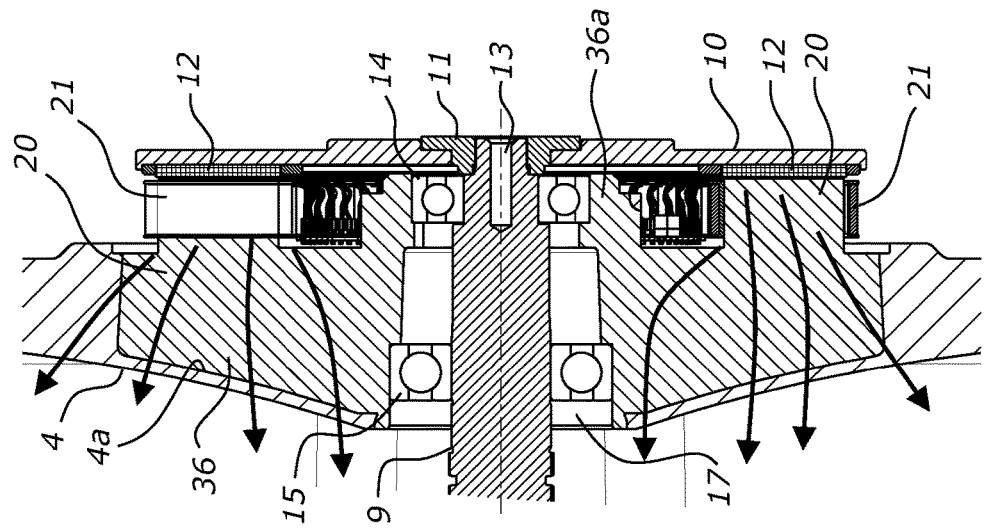
FIG. 3 is a cross-sectional view through a direct-drive electric motor assembly mounted to the closed end of a washing machine drum of a horizontal axis machine, according to a first embodiment of the invention.
Figure 4:
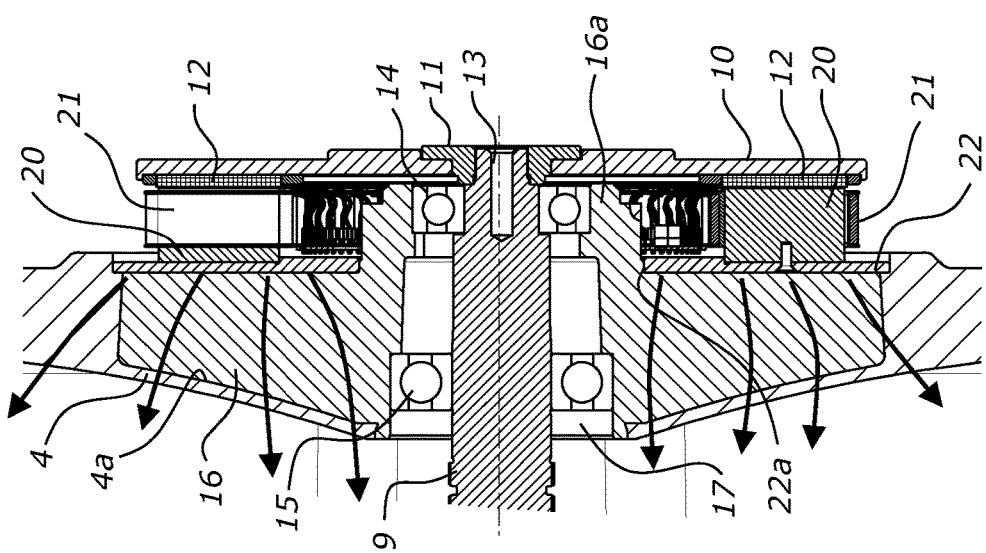
FIG. 4 is a cross-sectional view through a direct-drive electric motor assembly mounted to the closed end of a washing machine drum of a horizontal axis machine, according to a second embodiment of the invention.

In the embodiments of FIGS. 3 and 4, the rotor 8 preferably comprises a relatively light-weight yet rigid and cost-effective polymeric or plastics frame 10 formed for example by injection moulding. The rotor frame 10 comprises a central rotor hub 11, having a splined aperture which is fitted to splines on the end of drive shaft 9, and an outer rotor portion carrying a circumferential ring of permanent magnetic poles or dual pole elements 12. The rotor frame 10 may be formed from a plastics material and the hub 11 of metal, or alternatively the rotor frame may be formed as a single component from a single material such as a polymeric material or a metal. The rotor frame 10 may have a spider or spoked form for example. The rotor assembly is fixed to the rotor shaft 9 by a bolt (not shown) which threads into threaded bore 13 in the end of the rotor shaft.

As stated, the pair of axially-spaced bearings 14 and 15 are carried or mounted in the bearing housing component 16, which may for example be a cast or pressed metal component, and rotatably support shaft 9 carrying the rotor. The bearing housing component 16 is in turn fixed to the end of the outer drum 4 (bottom of the horizontally mounted drum in a horizontal axis machine). Outer or first bearing 14 is provided at or near the end of shaft 9 and bearing 15 adjacent the drum 4. A seal 17 mounts to the bearing housing 16 and extends radially inwardly to shaft 9 to provide a rotational seal to the shaft 9 and a static seal to the drum end. The bearings may be ball or roller bearings for example. In the embodiment shown the end of the drum 4 has a central, annular cavity or recess 4a around the coupling of the shaft 9 to the drum, of a shape and diameter to receive the bearing housing component 16. The bearing housing component 16 is mounted at least partially in the recess 4a and preferably substantially all of the bearing housing component 16 is mounted in the recess 4a.

FIGS. 3 to 5 are cross-sectional views through three embodiments of a direct-drive electric motor assembly of the invention generally as shown in FIG. 2, mounted to the closed end of a washing machine drum of a horizontal axis machine as in FIG. 2.

FIG. 6 is a cross-sectional view similar to FIGS. 3 to 5 but through a prior art direct-drive electric motor assembly, mounted to the closed end of a washing machine drum of a horizontal axis machine. In FIG. 6 the wash plate is also shown (not shown in FIGS. 3-5).

In the embodiment of FIG. 3, stator 6, including individual cores 20 and coils 21 around the cores 20, is fastened to the bearing housing component 16. The stator cores and coils 20/21 may be carried by an annular stator frame 22 having a central opening 22a into which a central annular extension 16a of the bearing housing component 16 enters when the stator is mounted to bearing housing component.

The stator cores 20 may be formed as a stack of thin, generally circular steel laminations, or a single helically-wound lamination. The stator cores extend axially (parallel with the rotational axis of the rotor 8 and rotor shaft 9), from the stator frame 22. The stator cores 20 may be suitably attached to the stator frame 22 including for example by being over-moulded by the stator frame if the stator frame is formed from a plastics material. The stator coils 21 wound around the axially aligned stator cores/poles 20 are therefore also axially aligned. In FIG. 2 a stator core 20 and coil 21 are shown cut through on one side and a stator core and coil on the other side of the figure are not.

Because in accordance with the invention the stator cores 20 and coils 21 are carried by the bearing housing component 16, having relatively high mass, through stator frame 22, the heat conduction path from the stator coils is improved (compared to a typical conventional radial flux motor assembly in a laundry washing machine). The stator cores 20 and coils 21 dissipate heat to or primarily to the (relatively large) bearing housing component 16 to which they are mounted, as indicated by arrows. The bearing housing component can in turn dissipate heat to the tub 4. There is a wide annular surrounding area of surface contact between the stator frame 22 and the bearing housing component 16 for high heat transfer. To also facilitate heat conduction the stator frame and bearing housing component 16 may be formed of metal, or alternatively a heat conducting composite material. In at least some embodiments dissipation of heat from the stator to the bearing housing component and to the tub 4 may assist in heating wash water in the tub, reducing the amount of hot water required by the machine for each warm wash. As shown the bearing housing component 16 is wider perpendicular to the rotational axis of the electric motor than it is deeper in the rotational axis of the electric motor, and substantially all of a major surface of the bearing housing component 16 across the rotational axis contacts the outer drum of the machine for maximum heat transfer from the bearing housing component to the outer drum. Also, the bearing housing component is shown as consisting of a single part (in this and other embodiments) but in an alternative embodiment may be made up of two (or more) parts, so long as those parts are bolted or otherwise fixed together to allow good heat conduction between them, similar to heat conduction through a single part bearing housing component.

The second embodiment of FIG. 4 is similar to that of FIG. 3 and the same reference numerals indicate the same components, except that in the embodiment of FIG. 4 the stator frame including stator cores 20, is integrated with the bearing housing component in one-piece component 36.

Again, because the stator cores 20 and coils 21 are carried by the bearing housing component 36, the heat conduction path from the stator cores and coils is improved.

The stator cores 20 and coils 21 dissipate heat to or primarily to the integrated stator frame and bearing housing component 36 to which they are mounted, again as indicated by arrows on FIG. 4.

In the third embodiment shown in FIG. 5 again the same reference numerals indicate the same components unless indicated otherwise. In this embodiment the motor is positioned between the bearings 14 and 15 as will be further described. However in this embodiment also, again the stator cores 20 and coils 21 are carried by a bearing housing component fixed to the closed end of the drum, so that the heat conduction path from the stator coils is improved.

In prior art FIG. 6, in which the same reference numerals as in FIGS. 3 to 5 indicate the same parts, and the heat conduction path from the stator cores and coils, indicated at 20a and 21a respectively, is again shown with arrows. The motor shown is a radial flux—permanent magnet synchronous electric motor with an external rotor 8a carrying magnet elements 12a. In FIG. 6 the wash plate 39 is shown attached to inner end of rotor shaft 9. The heat conduction path from the stator cores and coils in each of FIGS. 3 to 5 should be compared to the heat conduction path from the stator cores coils in prior art FIG. 6. In the prior art design the stator cores 20a and coils 21a are carried by a stator frame 40 which comprises a metal component, overmoulded with a plastics material. The stator frame 40 has a central aperture through which passes only a central axial part 16c of the bearing housing 16b, so that there is physical contact between the stator frame 40 and the bearing housing 16b only at this central aperture in the stator frame, and there is no physical contact between the stator cores 20a and coils 21a and the bearing housing 16. Heat dissipated by the stator cores 20a and coils 21a is largely to the air space around the stator coils i.e. heat is trapped, and there is minimal if any heat conduction from the stator cores 20a and coils 21a to the stator frame 40 and from the stator frame 40 to the bearing housing 16a. The primary heat conduction pathway from the stator cores and coils is not to the bearing housing component as in FIGS. 3 to 5. By "primary heat conduction pathway" from the stator coils to the bearing housing component is meant that a major fraction namely at least 50%, preferably at least 60%, 70%, 80%, or 90% of heat from the stator coils and/or cores is transferred to the bearing housing.

Referring again to FIG. 5, in this embodiment bearing 15 is carried or mounted in bearing housing component 46, which may again be for example a cast or pressed metal component. The outer bearing 14 is in this embodiment carried or mounted in an end plate or end mount component 47 which may have for example a disc-like form and optionally a spider or spoked structure, and attaches at or near it's outer periphery to the end of an annular peripheral wall of the bearing housing component 46, as indicated at 46a. The end plate or component 47 comprises a bearing mount cavity or seat 46b which mounts bearing 14, but alternatively the bearing 14 may be mounted to the end plate or component 47 in any way. The end plate or component 47 may optionally include aperture 46c. The end plate or component 47 may be for example a cast or pressed metal component, or alternatively a rigid plastic component.

While in the embodiments of FIGS. 3 and 4 the rotor 8 comprises a plastics frame 10 a rotor hub 11 formed as a separate metal component, in the embodiment of FIG. 4 the rotor and hub may be formed in this way or alternatively as shown all of the rotor 8 namely frame 10 and hub 11 are formed of a single material for example from metal pressing or casting, or of a plastics material. The rotor 8 is fixed to the shaft 9 by a bolt (not shown) which threads into threaded bore 13 in the end of drive shaft 9.

In the embodiment of FIG. 5 the bearing housing component 46 again comprises an integrated stator frame and bearing housing component. Because the stator cores 20 and coils 21 are carried by this integrated stator frame and bearing housing component 46, again the heat conduction path from the stator coils is improved. The stator cores 20 and coils 21 dissipate heat to or primarily to the bearing housing component 46, as indicated by arrows on FIG. 5.

In the embodiment of FIG. 5 in which the motor is positioned between the bearings, the motor may alternatively be a RF-PMSM motor.

As previously described, washing machines incorporating an electric motor assembly of the invention may be front-loading or top or tilt access, horizontal axis laundry washing machines or top-loading, vertical axis laundry washing machines. Electric motor assemblies of the invention may be incorporated in laundry dryers or washer-dryers, which are conventionally horizontal access.

The foregoing describes the invention including preferred forms thereof. Modifications and alterations as will be obvious to those skilled in the art may be made without departing from the scope of the invention, as defined in the claims.

The invention claimed is:

1. An electric motor assembly suitable for driving a laundry machine, being a laundry washing machine or dryer or washer-dryer, the laundry machine comprising a drum for holding a load of laundry, which drum comprises an outer drum or tub, the motor assembly comprising:
    an electric motor comprising a single stator comprising stator coils wound upon stator cores carried by a stator frame, and a single rotor comprising permanent magnets and directly-driving an output drive shaft from the motor, wherein the rotor magnets and stator coils are spaced axially so that the magnetic flux path between the rotor magnets and stator coils is oriented axially,
    a bearing housing component configured to rotatably support the output drive shaft and adapted to be associated with a base of the outer drum or tub of the laundry machine, wherein the stator associated with the bearing housing component, and to provide a primary heat conduction pathway from the stator coils to the bearing housing component,
    said primary heat conduction pathway comprising a substantially axial heat conduction pathway between at least one of the stator coils and the bearing housing component, wherein the substantially axial heat conduction pathway passes through an annular area of surface contact between the stator frame and the bearing housing.

2. The electric motor assembly according to claim 1 wherein the stator frame is attached to the bearing housing component.

3. The electric motor assembly according to claim 1 wherein the stator cores and stator frame are integral with the bearing housing component.

4. The electric motor assembly according to claim 1 wherein the motor is positioned between axially spaced bearings mounting the rotor.

5. The electric motor assembly according to claim 1 wherein the rotor bearing housing component is adapted to mount axially-spaced bearings to rotatably support the rotor.

6. The electric motor assembly according to claim 4 wherein the rotor bearing housing component is adapted to mount one of said bearings and an outer plate or outer mount component is adapted to mount another of said axially-spaced bearings.

7. The electric motor assembly according to claim 6 wherein the outer plate or outer mount component is attached to a periphery of the bearing housing component.

8. The electric motor assembly according to claim 1 wherein the bearing housing component is wider perpendicular to the rotational axis of the electric motor than it is deeper in the rotational axis of the electric motor.

9. A laundry machine including the electric motor assembly according to claim 1.

10. The machine according to claim 9 wherein the bearing housing component is fixed to a closed end of the outer drum or tub of the laundry machine.

11. The machine according to claim 10 wherein a base of the outer drum or tub comprises a recess and the bearing housing component is mounted at least partially in the recess.

12. The machine according to claim 11 wherein substantially all of the bearing housing component is mounted in the recess.

13. The machine according to claim 10 wherein the bearing housing component is wider perpendicular to the rotational axis of the electric motor than it is deeper in the rotational axis of the electric motor, and substantially all of a major surface of the bearing housing component across the rotational axis contacts the outer drum of the machine for maximum heat transfer from the bearing housing component to the outer drum.

14. The laundry machine according to claim 10 wherein the anular area of surface contact between the stator frame and the bearing housing is flush with, or located within a recess of, a closed end of the outer drum or tub.

15. The laundry machine according to claim 11 wherein the annular area of surface contact between the stator frame and the bearing housing is also located within the recess wherein the bearing housing is at least partially mounted in the recess.

\* \* \* \* \*